United States Patent
Salzer et al.

(10) Patent No.: US 6,769,739 B2
(45) Date of Patent: Aug. 3, 2004

(54) VEHICLE SEAT, ESPECIALLY FOR AIRCRAFT

(75) Inventors: Uwe Salzer, Salem (DE); Hans-Dieter Abt, Schwabisch Hall (DE)

(73) Assignee: Recaro Aircraft Seating GmbH & Co., Schwabisch Hall (DE)

( * ) Notice: Subject to any disclaimer, the term of this patent is extended or adjusted under 35 U.S.C. 154(b) by 0 days.

(21) Appl. No.: 10/240,320

(22) PCT Filed: Apr. 18, 2001

(86) PCT No.: PCT/EP01/04388
§ 371 (c)(1),
(2), (4) Date: Oct. 1, 2002

(87) PCT Pub. No.: WO01/81172
PCT Pub. Date: Nov. 1, 2001

(65) Prior Publication Data
US 2003/0075962 A1 Apr. 24, 2003

(30) Foreign Application Priority Data
Apr. 19, 2000 (DE) .......................... 100 19 484

(51) Int. Cl.[7] .............................................. A47C 1/032
(52) U.S. Cl. .................. 297/354.13; 297/317; 297/342; 297/322
(58) Field of Search .......................... 297/354.13, 342, 297/343, 322, 317, 321

(56) References Cited

U.S. PATENT DOCUMENTS

| | | | |
|---|---|---|---|
| 2,629,425 A | | 2/1953 | James |
| 4,058,342 A | * | 11/1977 | Ettridge ................. 297/256.13 |
| 4,104,747 A | * | 8/1978 | Bell et al. ...................... 5/37.1 |
| 4,285,541 A | * | 8/1981 | Onishi .......................... 297/84 |
| 4,333,681 A | * | 6/1982 | Nelson ......................... 297/83 |
| 4,492,407 A | * | 1/1985 | Broadhead ................... 297/78 |
| 5,358,308 A | * | 10/1994 | Judic et al. ................. 297/316 |
| 5,611,594 A | * | 3/1997 | Findlay ........................ 297/28 |
| 5,886,461 A | * | 3/1999 | Chadha ...................... 313/355 |

FOREIGN PATENT DOCUMENTS

| | | | |
|---|---|---|---|
| DE | 675982 | 5/1939 | |
| DE | 3725462 A1 * | 2/1989 | ........... A47C/1/037 |
| DE | 19607060 | 4/1997 | |
| EP | 0957025 | 11/1999 | |
| EP | 1074468 | 2/2001 | |

* cited by examiner

*Primary Examiner*—Peter M. Cuomo
*Assistant Examiner*—Stephen D'Adamo
(74) *Attorney, Agent, or Firm*—Roylance, Abrams, Berdo & Goodman, LLP

(57) ABSTRACT

A vehicle seat, especially for aircraft, includes a seat part (10) and a backrest (12) displaceable relative to each other by at least one adjustment device (14). The adjustment device (14) is provided with a plurality of articulation points (16) interconnected via a bar-type supporting frame (18) with individual bar elements (26, 30, 32, 36, and 40). The frame raises and supports the seat part (10) relative to the vehicle or cabin floor and effects a displacement movement by an actuator (28). The seat part (10) can be brought from an initial position (1) into at least one further position (II, III) and back. Depending on the number of articulation points and bar elements of the frame, the number of possible movements and the degree of freedom of movement of the seat part is substantially higher than in known systems. The seat part and the backrest can be safely positioned within a very wide range of adjustable positions.

13 Claims, 3 Drawing Sheets

VEHICLE SEAT, ESPECIALLY FOR AIRCRAFT

FIELD OF THE INVENTION

The present invention relates to a vehicle seat, especially an aircraft passenger seat, with a seat component and a backrest displaceable relative to each other by one adjustment device. The adjustment device has a plurality of moving joints connected to each other, at least partially by a bar-type supporting frame. Individual bar parts position the seat component upright relative to an aircraft or cabin deck, and execute a traversing movement by means of an actuating device in such a way that the seat component maybe moved from an initial position to at least one additional position and vice versa. The moving joints are mounted at least in part at the corner points of the bar-type supporting frame. At least one moving joint is provided in the area of the transition between backrest and seat component.

SUMMARY OF THE INVENTION

On very prolonged trips for long-range flights or for travel by ship, for example, by ferry, it is a general aim of aircraft or ferry outfitters to increase the comfort of seat occupants and the passengers to be transported. Customers, especially in the first-class and business-class areas, have their own ideas regarding seat comfort. The trend is to accommodate the wishes of passengers who want to be able to use their travel time for meaningful rest or sleep, for example, in order to counteract fatigue phenomena at their destination after a long-range flight.

DE 675 982 C discloses a generic aircraft seat with a bar-type supporting frame resembling a so-called guide rod parallelogram. The guide rod parallelogram in question makes it possible to adjust a vertically adjustable aircraft pilot seat. The seat simultaneously is pivotable about an axis mounted transversely to the direction of flight and permits longitudinal adjustment, separately about the transverse axis in each vertical or longitudinal setting. For this purpose, in the case of the conventional solution, an upper rigid bar part is connected by moving joints both to the seat component and to the backrest. Extending parallel to the upper rigid part is a lower rigid bar part of the conventional bar-type supporting frame from a seat rail longitudinal adjustment device to other bar parts to which the rear area of the backrest is engaged by moving joints. The lower rigid bar part is also connected to the indicated structural components by moving joints mounted on the lower bar on the end side. The conventional bar-type supporting frame increases the size of the pilot's seat, so that its use in the cabin area of an aircraft with cramped installation conditions appears unreasonable. In addition, the bar-type supporting frame engages the movable seat components of the pilot's seat in such a way that adjustment options are provided only within a very narrow range. For example, a sleeping or reclining position option is also precluded, which option not being desirable for aircraft pilots. As a result of the specific structural embodiment, the conventional bar-type supporting frame is also not capable of absorbing the forces introduced into the seat structure in the event of a crash. Consequently, failure of the structure might be expected in the event of a crash.

In contrast, subsequently published EP 1 074 468 A2 discloses a distinctly improved aircraft passenger seat which permits assumption of different positions, including a reclining position and a sleeping position. In the sleeping position, the upper sides of the backrest, seat component, and legrest form a more or less level reclining surface. A longitudinally adjustable bar part, which may be telescoped to various positions to swivel the backrest by means of an actuating device, engages the lower third of the backrest.

In addition, the backrest may be mounted by a moving joint on the seat component in the area of transition between the moving joint and the seat component. The respective moving joint in the transitional area is in turn movable in a longitudinal guide. The longitudinal guide extends more or less horizontally and is made up of components of armrests of the aircraft passenger seat. When mounted to be stationary, the armrests delimit on either side the longitudinal sides of the passenger seat which otherwise may be adjusted to various positions. If another actuating mechanism engages the front bar part which on the end side is hinged to the deck of the cabin and to the bottom of the seat component in its front area and accordingly the front bar part pivots, the seat may assume its individual positions and is forced along the armrests by way of the longitudinal guides. Consequently, the solution disclosed in the European patent application does not make use of any bar-type supporting frame. Rather, such solution depends on forced guiding for the process of movement. As a result of the diagonal mounting of the rear, variable-length bar part, which engages the backrest in the lower third of the rear area, much structural space is in turn wasted, since it is necessary to secure the movable components by way of a separate cover so that the leg area of the next seat occupant to the rear will not be interfered with or even injured.

SUMMARY OF THE INVENTION

Objects of the present invention are to provide improved seating systems having increased requirements for the convenience and seating comfort of passenger, while the systems take up little structural space and meet the more stringent requirements set for crash safety.

The foregoing objects are basically attained by passenger seats having the respective moving joint connected in the transition area to one end of the upper bar part extending along the seat component and to the end of a rear bar part. The other end of the upper bar part is connected by another moving joint to a front bar part. The rear and the front bar parts position the seat component at least partly upright relative to the floor. At least the front bar part or the rear bar part is longitudinally adjustable. The number of possible movements, and accordingly the degree of freedom relative to the conventional solutions is distinctly increased as a function of the number of moving joints and bar parts of the bar-type supporting frame. The seat component and the backrest may be positioned over a very wide range of settings. In this situation, the bar-type supporting frame with its rigid and longitudinally partly adjustable bar assumes exclusively the function of a guide for the entire movement concept. Additional forced guides inherently restrict adjustability and may be abandoned in their entirety.

In addition, the seat kinematics of the present invention permit use of the traversing movement of the seat component to at least one of the additional positions to lower the seat component relative to its initial position. The seat component then assumes an inclined position to bring about a reclining position for the seat occupant. In the process, the backrest automatically follows the slope of the seat component. As a result of the pivoting movement of the bar-type supporting frame in such a way, an overall reclining surface extending obliquely is achieved as a reclining position for the seat occupant. The otherwise conventional function of the vehicle or aircraft passenger seat is accordingly transformed into that of a full sleeping area for resting or sleeping. If in the process the legrest, guided by the bar-type supporting frame, automatically follows the movement of seat component and backrest, the obliquely extending reclining surface is extended downward into the foot area so that the sleeping area can thus be completed. Since the entire bar-type supporting frame is situated more or less below the seat component, the present invention conserves structural space and to this extent is particularly well suited under confined installation space conditions such as are present in aircraft or the like. Production of the bar-type supporting frame with its bar parts results, especially in the base position with the backrest fully upright, in a compact structural unit. Its bar components ensures that if any crash forces are introduced into the seat, they will be reliably absorbed and may be diverted into the vehicle floor or cabin deck without breaking off of parts of the bar-type supporting frame or even collapse of the seat components, which are kept apart by the fixed bar-type supporting frame.

Preferably, between the initial position and the reclining position, at least one other comfort position can be adjusted in which the rear seat component surface is lowered relative to the front seat component surface. This position is conducive to relaxed working. Stress on the legs in the forward resting area with the seat component can be accordingly relieved by the raised position. The indicated adjustment processes can be effected in an economical manner with only a few components. Thus, a vehicle seat according to the present invention can be produced economically and is structurally light. The lightness is useful in aircraft in helping to avoid unnecessary weight.

The vehicle seat of the present invention need not be limited in use to an aircraft passenger seat. It can also be used aboard ships, for example in ferry operation, or in other modes of travel, such as trains or busses.

Preferably, the actuators used are driven pneumatically to produce the motion for the adjustment device. Optionally transient processes in the adjustment of the seat element to one another is cushioned by piston-cylinder units with pneumatic dampers. Furthermore, in one preferred embodiment of the vehicle seat of the present invention, the adjustment device at least with the seat component and backrest can be built as modular components. Such modular components can then be joined to other seat component elements, such as the seat side parts, to armrests, or the like for subsequent seat use by pallet delivery on site, for example in the aircraft. This also has the advantage that, when the seating is changed, for example when the intended number of seats is increased in the same area, the luxury vehicle seats of the present invention can be changed into conventional seats without an expanded reclined position. Furthermore, the seat component and backrest surface which is subject to greater wear can be cleaned or repaired elsewhere, and for example, can be provided with a new covering material. The seat components which are otherwise less subject to wear or dirt and which are also called compartments in technical language can then remain in the respective vehicle, for example in the aircraft, and can be equipped there in very short time with a new or maintained adjustment device with the seat component and backrest.

Other objects, advantages and salient features of the present invention will become apparent from the following detailed description, which, taken in conjunction with the annexed drawings, discloses a preferred embodiment of the present invention.

BRIEF DESCRIPTION OF DRAWING

Referring to the drawings which form a part of this disclosure.

DETAILED DESCRIPTION OF THE INVENTION

Figure 1:
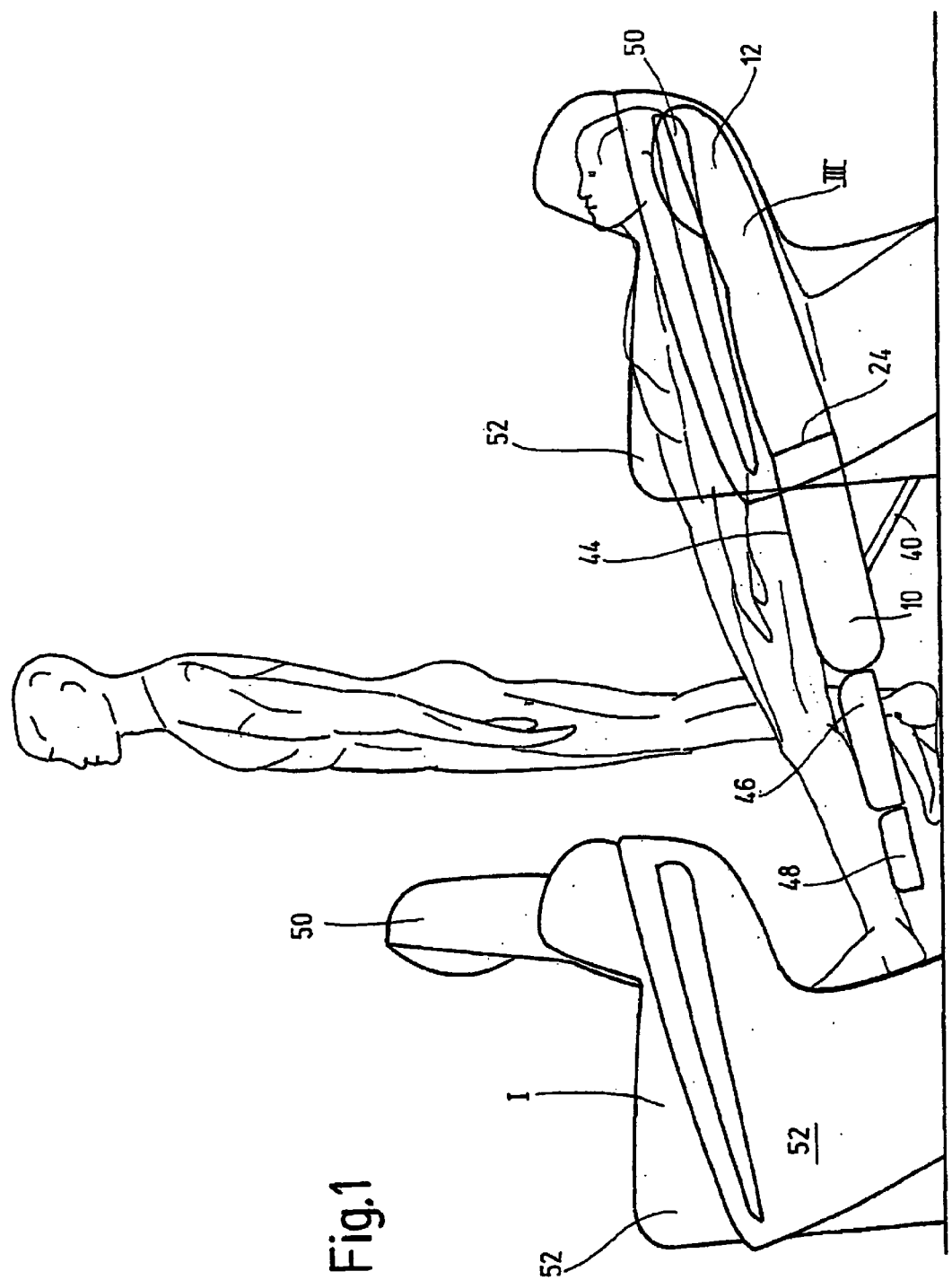
FIG. 1 is a side elevational view of a part of an aircraft passenger seating with one aircraft passenger seat shown in a seated position and one aircraft seat in the reclining position, and with a standing and reclining seat occupant illustrating the approximate size ratios and arrangement of the seating.
Figure 2:
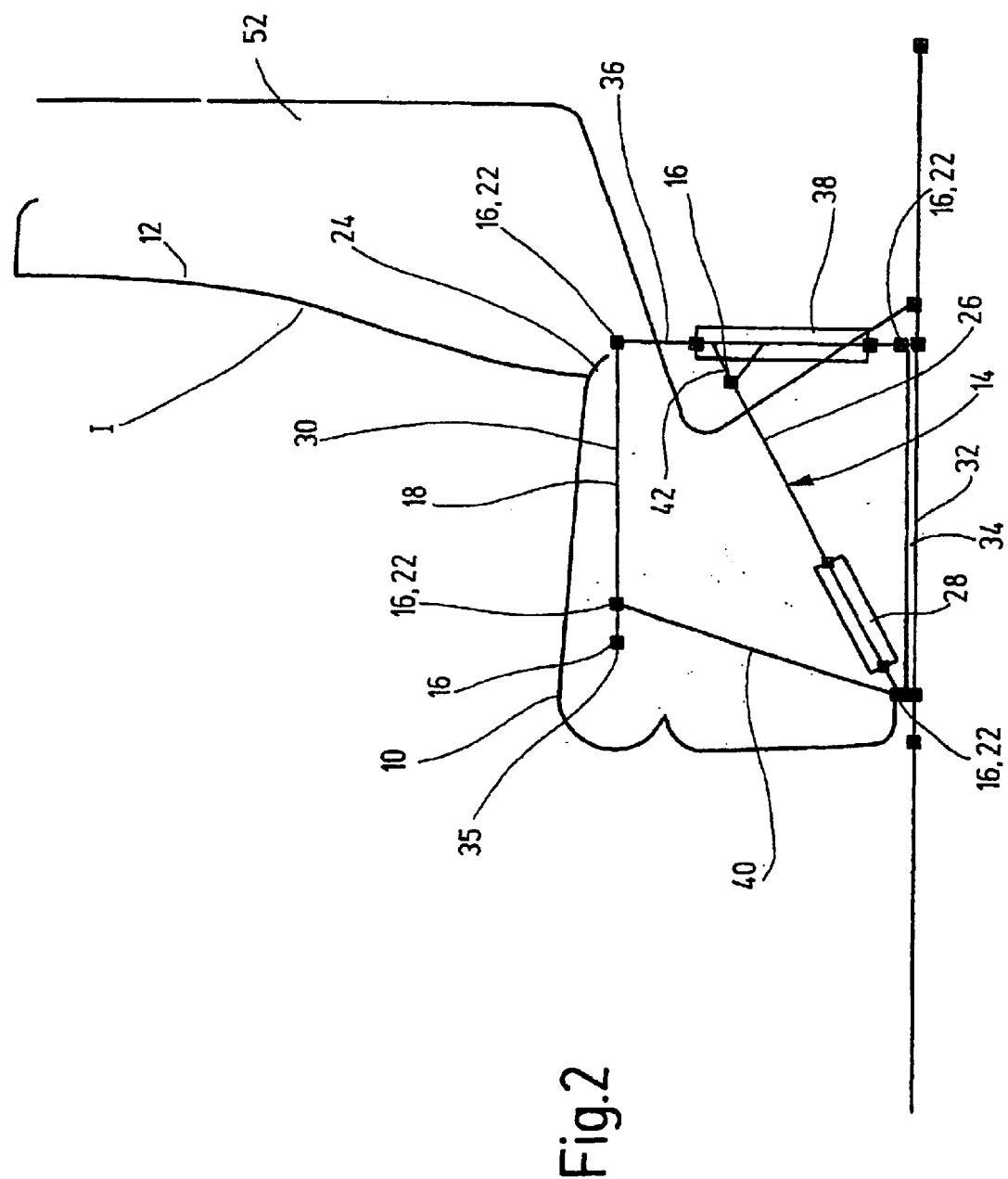
FIG. 2 is a side elevational view of the important parts of the seat kinematics and of the aircraft passenger seat itself.
Figure 3:
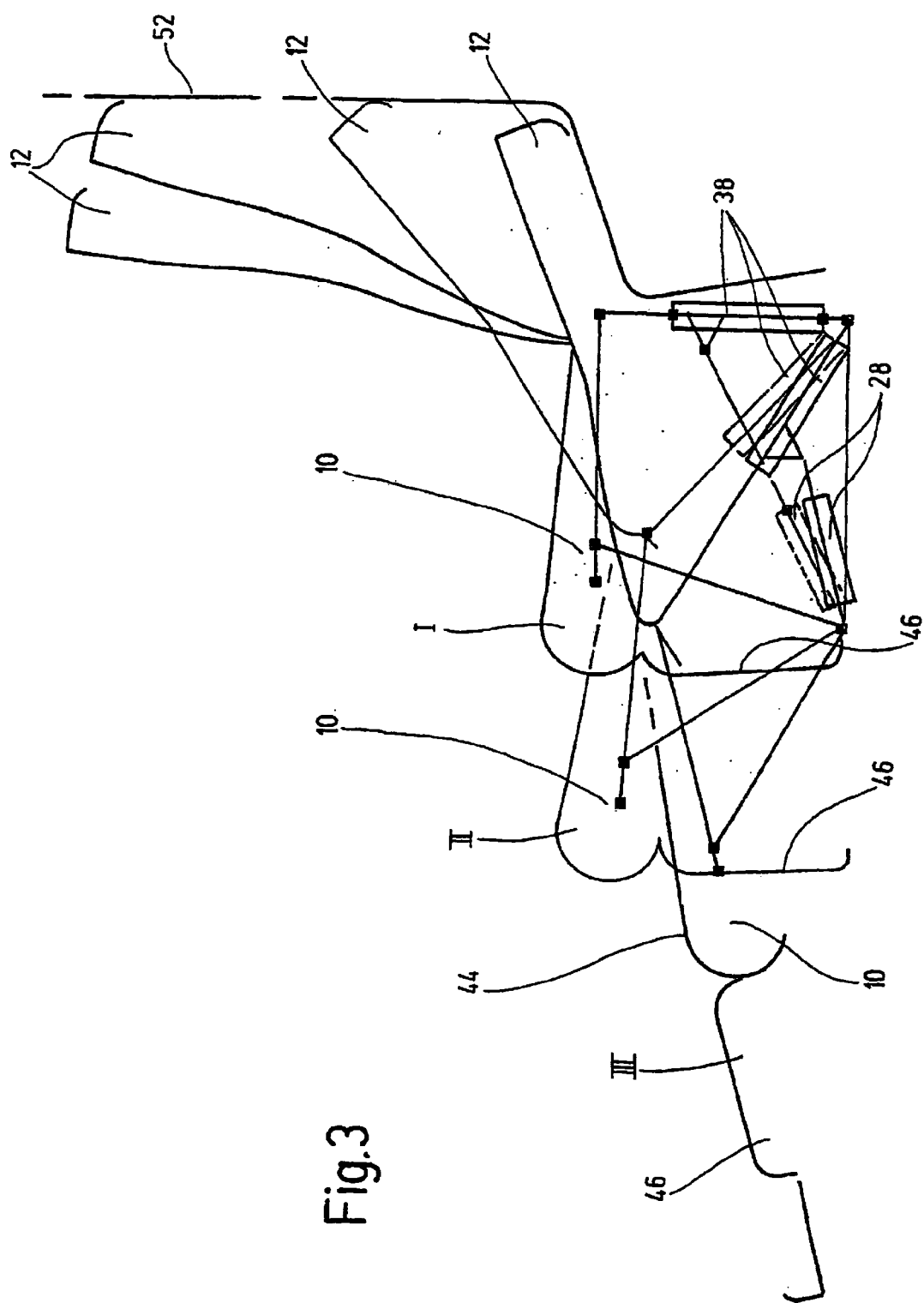
FIG. 3 is a side elevational view of the aircraft passenger seat of FIG. 2 in different positions.

The aircraft passenger seat as shown in FIGS. 1 to 3 is provided with a seat component 10 and a backrest 12. In the conventional manner, which is not detailed here, both the seat component 10 and the backrest 12 have the corresponding upholstery and ergonomically advantageous seat contours. Both the seat component 10 and the backrest 12 are held to be able to move relative to one another by an adjustment device 14. The adjustment device 14 has several moving joints 16 which are joined to one another by a bar-type supporting frame or framework 18. The framework bears the seat component 10, and executes a traversing movement, especially in the form of a swiveling movement, by means of an actuating device or actuator 28 such that the seat component 10 can be moved out of the initial position I as shown in FIG. 3 into two other positions II and III. By reversing the direction of motion, the original initial position I can be assumed again.

As shown especially by FIG. 2, there are four moving joints 16 on the four corner points 22 of the bar-type supporting framework 18. At least one moving joint 16 is in the area of the transitions 24 between the backrest 12 and the seat component 10. In the area of that transition 24, the indicated one moving joint 16 can engage a seat component fitting or the like or part thereof. This arrangement produces forced guidance in the desired adjustment motion between the seat component 10 and the backrest 12.

The bar-type supporting framework 18 has a bar part 26 adjustable in length and which interacting with actuator 28. Actuator 28 is preferably in the form of a pneumatic-piston cylinder unit. As seen in FIG. 2, actuator 28 extends obliquely between the upper rigid bar part 30 and the underlying lower rigid bar part 32 within the bar-type supporting framework 18. The upper rigid bar part 30 fits into the seat component 10 and is peripherally padded by it in this way. By this extension over the seat component 10, the moving joints 16 and the assignable bar-type supporting framework 18 are not hindered in their free, desired motion. The lower rigid bar part 32, like the upper rigid bar part 30, is not adjustable or variable in its length. The lower bar part 32 is used to position the aircraft passenger seat upright over the deck area by a conventional seat rail 34 connected to parts of the aircraft deck. In an extension of the upper bar part 30, on its front end, another moving joint 16 forms the coupling point 35 to the seat component 10.

The bar-type supporting framework 18 has another back bar part 36 which can be adjusted in length and which interacts with the equalization part 38. The actuator 28 with its actuating part in the form of the bar part 26, engages equalization on part 38 by means of another moving joint 16. The opposing end of actuator 28, in turn, is connected to the front moving joint 16 of the lower rigid bar part 32. The latter moving joint 16 of the lower bar part 32 is in turn hinged to the assigned, underlying moving joint 16 of the upper bar part 30 by means of another rigid front bar part 40. The coupling to the upper rigid bar part 30 of this nature takes place by way of the moving joint 16 which keeps the front upper corner point 22 of the bar-type supporting framework 18 occupied. The equalization part 38, like the actuator 28, also is a piston-cylinder unit, but having a pneumatic damping device to counteract unwanted vibration motions when the seat is being adjusted by way of the bar-type supporting framework 18. Damping devices and piston-cylinder units of this nature in the prior art are known as adjustment means in the domain of vehicle seats, and thus, are not described in detail.

The indicated bar-type supporting framework 18 as a whole, like the adjustment device identified as a whole as 14, can easily engage the vehicle seat elements. Especially in a successive arrangement in the planes of the drawings in front and behind, as shown in FIG. 2, the described arrangement can be congruently present two or more times. For example, in the areas of the two lengthwise edges of the seat, one bar-type supporting framework 18 (not detailed) at a time can be actuated from a central location by an actuator 28 by bracing the moving joints 16 located in succession in a line with crossbars. The latter is also advantageous inasmuch as the bar-type supporting framework 18 also continues in the cross direction. When viewed transversely to the seat surface, actuator 28 contributes to the bracing of the seat structure. The indicated bar parts of the bar-type supporting framework 18 moreover need not be bar-like or tube-like. For example, this can be geometrically shaped supports, such as an aluminum diecasting material or the like.

In the initial position I of the aircraft passenger seat, as shown in FIG. 2, the bar-type supporting framework 18 is made in the configuration of a trapezoid. The trapezoid two base lines extending parallel to one another are formed by the upper rigid bar part 30 and the lower rigid bar part 32. The two legs of the trapezoid are not parallel to one another, and are respectively formed by the bar parts 40 and 36 with the equalization part 38. For the engagement of the actuator 28, by way of its telescoping bar part 26, to the housing of the equalization part 38, a bar-like triangular receiver 42 is used. The receiver free end is provided with the moving joint 16 for a transition or connection to the bar part 26. In the initial position I, the back bar part 36 with its equalization part 38 toward the seat rail 34 or toward the mounting deck of the aircraft includes an angle of 90°. The included angle between the bar part 26 with the actuator 28 and the horizontal seat rail 34 or the deck is roughly 30°.

If preferably the seat occupant triggers the actuator 28 by an actuation device (not detailed) for the seat adjustment process, the pneumatics pulls the bar part 26 into the actuator 28. This pulling causes the bar parts 40 and 36, with the equalization part 38, to swivel counterclockwise around the lower moving joints 16 in the transition area of the bar-type supporting framework 18 to the seat rail 34. In this manner the upper bar part 30 entrains the seat component 10, as seen in the line of sight to FIG. 3, forward and down until comfort position II is reached, for example. In this comfort position II, the rear seat component surface, as shown, is lowered relative to the front seat component surface. By way of the seat component fittings (not detailed), the rear upper moving joint 16 on the corner point 22 of the bar-type supporting framework 18 entrains the backrest 12 such that it passes into the tilted position as shown in FIG. 3. For the displacement motion of this type, the back bar part 36 is extended, preferably damped, out of the equalization part 38 over a definable distance. Furthermore, in the pertinent traversing motion, the equalization part 38 swivels counter-clockwise around the bottom moving joint 16 and the actuator 28 swivels clockwise around its lower moving joint 22 by a given distance.

If the traversing process is continued, the seat component 10 in the reclining position III assumes a tilted position. The backrest 12 follows the tilt of the seat component 10 by way of the already indicated guidance due to the swiveling motion of the bar-type supporting framework 18. In this manner, overall an obliquely running reclining surface 44 (compare also FIG. 1) for the seat occupant is reached. The reclining surface 44 in question, relative to the floor surface on which the seat is located, is at an angle of approximately 15°, to the extent that the reclining surface in question is extended in the direction of the floor either by legrest 46 or virtually downward. The legrest 46 itself, likewise is guided in turn, for example, by the corresponding fitting parts (not shown), and can follow the motion of the seat component 10 and the backrest 12 to obtain an obliquely running reclining surface 44. In doing so, the legrest 46 towards the bottom end can have a calf rest 48. The backrest 12 preferably has integrated a headrest 50 for accommodating and supporting the head of the seat occupant in the reclining or sleeping position III, as is indicated in FIG. 1.

The different positions I, II, and III can be reversibly assumed by the indicated seat kinematics with the bar-type supporting framework 18 and adjustment device 14 with a drive motor 28 or a trimming motor in the form of the equalization part 38. In doing so, application is made essentially of a four-bar mechanism as the bar-type supporting framework 18, which can be implemented especially economically and still allows force to be diverted into the base frame of the seat, for example in the case of a crash or the like. Instead of the indicated pneumatic components 28 and 38, the motor and trim function can be attained also by way of other drive means, for example in the form of electric motors and spindle drives.

On the basis of the indicated lowering of the seat level into the sleeping or reclining position III, in the area of the seat component 10 which is tilted obliquely down, a low climb-over height is made possible. Another seat occupant in a row of seats can then easily, if necessary, climb over the individual reclining in the row without disturbing him. The kinematics by way of the trapezoid supporting framework 18 is designed such that, with only minor adjustment motions on the four-bar mechanism, the vehicle seat can be changed with its adjustments within a very wide range of variation. The respective adjustment due to the short swiveling and traversing motions completed can also be quickly accomplished. By simply swiveling back and forth, especially of the bar parts 40 and 36, an extensive adjustment range can be accomplished in both directions.

It is furthermore especially advantageous for the adjustment device 14 together with the seat component 10, the backrest 12 and the legrest 46 to form a modular component which can be detachably connected on site to other seat components, such as the side seat components 52 (compare FIG. 1) for seat use. The side seat components 52 can be left in the manner of a compartment in the aircraft, permitting replacement only of the function unit which ensures positions I to III, for example, for maintenance purposes. The indicated compartment can thus perform multiple functions in cases of side seat components 52, and can further be made such that a self-contained area (not shown) for the seat occupant is ensured allowing a large amount of privacy. It is also quite possible to add a bar area, a washing facility, or the like to the compartment. Furthermore, equipment, such as a computer or special connections for notebooks, help to create a workplace with the facility for reclining and sleeping within the pertinent self-contained area. In particular passengers on long trips are helped in this way, and fatigue can thus be effectively alleviated.

While one embodiment has been chosen to illustrate the invention, it will be understood by those skilled in the art that various changes and modifications can be made therein without departing from the scope of the invention as defined in the appended claims.

What is claimed is:

1. A vehicle seat, comprising:

a seat component;

a backrest;

an adjustment device coupling said seat component and said backrest for relative displacement therebetween, said adjustment device having moving joints connected to one another at least partially by a bar supporting framework with individual bar parts and corner points, said framework positioning said seat component upright relative to a vehicle floor, said moving joints being located at least in part on said corner points, a first of said moving joints being in a transition area between said seat component and said backrest, said first moving joint being connected to a first end of an upper bar part extending lengthwise along said seat component and being connected to a front bar part, a back bar part being connected by a second moving joint to an opposite second end of said upper bar part, one of said front bar part and said back bar part being adjustable in length;

an actuator in said framework for executing a transversing movement to move said seat component between an initial position and other positions; and a force guidance causing said backrest to follow tilting of said seat component due to swiveling motion of said framework such that said seat component and said backrest define an obliquely extending reclining surface as a reclining position for a seat occupant.

2. A vehicle seat according to claim 1 wherein a legrest is connected to said seat component to follow and be guided by movement of said seat component and said backrest to extend said obliquely extending reclining surface downwardly.

3. A vehicle seat according to claim 1 wherein said framework lowers said seat component in moving from said initial position to said other positions, and tilts said seat component for a reclining position.

4. A vehicle seat according to claim 1 wherein said framework comprises an intermediate bar part which is adjustable in length, which includes said actuator and which is located between said upper bar part and a lower rigid bar part, said upper bar part being rigid.

5. A vehicle seat according to claim 1 wherein said framework comprises a lower bar part, with said upper part, said front bar part, said back bar part and said lower bar part substantially forming a trapezoid in said initial position thereof in which said upper and lower bar parts form base lines of said trapezoid.

6. A vehicle seat according to claim 1 wherein said other positions comprise a comfort position in which said backrest is adjustably lowered relative to said seat component, and a reclining position.

7. A vehicle seat according to claim 1 wherein said back bar part is adjustable in length.

8. A vehicle seat according to claim 1 wherein said seat component and said backrest comprise modular parts interchangeable with other components of the vehicle seats.

9. A vehicle seat according to claim 8 wherein said other components comprise seat sides.

10. A vehicle seat according to claim 1 wherein said back bar part is adjustable in length, and has an equalization part engaged through an intermediate moving joint with a first end of said actuator;p and an opposite second end of said actuator is connected to a moving joint connected to a lower bar part and said front bar part, said front bar part being rigid.

11. A vehicle seat according to claim 10 wherein said equalization part and said actuator each comprise a piston-cylinder unit.

12. A vehicle seat according to claim 11 wherein said equalization part comprises a damper.

13. A vehicle seat according to claim 11 wherein said actuator is pneumatically triggered.

* * * * *